INVENTORS
SIDNEY J. KAPLAN
FLEUR B. SMITH
HERBERT W. BOMZER
EDWARD GOLD.

United States Patent Office 2,973,587
Patented Mar. 7, 1961

2,973,587

OPTICAL RADAR TRAINER

Sidney J. Kaplan, Kew Gardens Hills, and Herbert W. Bomzer, New Hyde Park, N.Y., Fleur B. Smith, Los Angeles, Calif., and Edward Gold, Plainview, N.Y., assignors to Sperry Rand Corporation, Ford Instrument Company Division, Long Island, N.Y., a corporation of Delaware Filed Apr. 26, 1957, Ser. No. 655,438

4 Claims. (Cl. 35—10.4)

This invention relates to radar trainers and particularly to an optical system for a shadow detection presentation upon a radar scope of simulated city areas or hilly terrain which are reduced to scale models.

In the present state of the art for predicting city area target displays upon airborne radar indicators, the known systems of optical and electronic devices suffer in general from limitations associated with poor shadow detection, poor resolution, absence of analogue output and/or their inability to operate at a rate compatible with actual radar systems.

Generally speaking the invention contemplates an optical system in combination with electronic and servomechanism circuitry for eliminating the above mentioned defects. In its embodiments, a radar beam is simulated by a light beam which radially scans a horizontal three dimensional scale model of a target city area, the light beam being directed by an oscillating mirror. A photosensitive cell optically located at the same position as the light source observes the illuminated spot on the model and intensity-modulates the scope spot on a PPI type cathode ray indicator. The selected target sector is scanned for visual presentation. The model is slowly rotated on a platform directly below the oscillating mirror, a servomechanism system between the rotating model platform and the rotating deflection coils on the PPI scope effects the required azimuth synchronization. Radial synchronization and means for the detection of shadow areas caused by mountains or by tall buildings in city areas are provided in one embodiment of the invention by a seeker photocell unit moving under the control of a lead screw in a plane parallel to the plane of the model and directly over the radially scanning line. The seeker photocell unit having two photoconducting cells cofunctions with another servomechanism system for maintaining its position directly above the light beam spot on the model while a potentiometer operatively driven by the servomotor provides the sweep signal for the deflection coils associated with the PPI scope. Additionally, the potentiometer output produces a simulated shadow area on the scope face when the seeker cell unit is accelerated to cross over an area on the model having no reflection, the jump in the normally uniform speed of the scope spot appearing as a shadow. As a desired step in achieving true targe simulation, a slip ring system extinguishes the response of the optical unit during its return sweep. Since actual transmitted radar pulse dimensions change with distance from the radar antenna, the azimuth dimension increasing and the radial dimension decreasing, this invention contemplates a lens projecting system to simulate the desired characteristic.

In another embodiment of the invention, a television camera focused on the line of the radial light sweep along the model provides a video signal output of a shadow area in a true time relationship to the start of each radial light sweep from its origin, the video signal being essentially duplicated for successive TV camera sweeps as a consequence of employing a much higher camera sweep rate than that used for the radial light sweep rate. The video shadow signal controls a gating unit in the series path of the intensity modulated signals from the photosensitive pickup to the grid of the cathode ray tube so as to extinguish the scope spot for the shadow areas. Means for synchronizing the scope sweep with the camera sweep is, of course, provided.

The features of the invention will be understood more clearly from the following detailed description taken in conjunction with the accompanying drawings in which.

Figure 1:
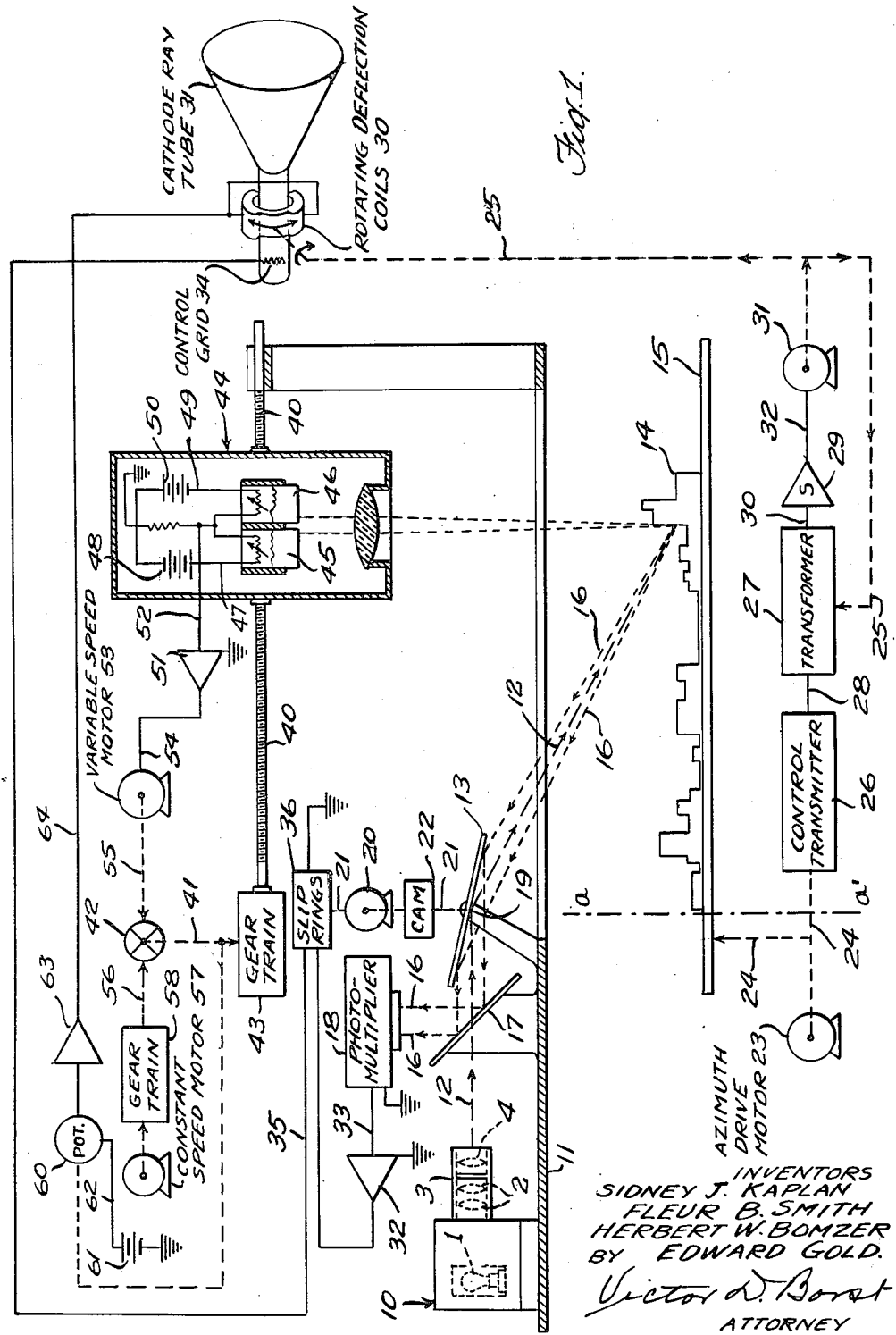
Fig. 1 is a schematic diagram of a shadow detection radar trainer employing a seeker cell unit driven by a lead screw.

Referring to the seeker cell shadow detection radar trainer as disclosed in Fig. 1, a light beam projector system 10 disposed on a horizontal plate 11 projects a horizontal beam of light 12 upon a rotatable mirror 13 from whence it is deflected to a three dimensional scale model of an area 14 shown as a city, the model 14 being disposed upon a rotatable plate 15 having a vertical axis $a—a'$. The returned beam of light 16 from the model 14 is reflected from the mirror 13 to a semi-silvered mirror 17, the mirror 17 being disposed in the light beam path and positioned on plate 11 between the projection system 10 and the mirror 13. The mirror 17 has an approximate 45° angle of incidence with respect to the reflected light beam 16 so that the reflected light beam can be directed to a photosensitive multiplier 18. The rotatable mirror 13 is pivoted about a horizontal journal 19 and is driven in an oscillatory manner by a radial scan motor 20 which drives a shaft 21 and a cam 22 to effect a constant ground range scan rate along the three dimensional model 14 from a point directly below the mirror 13 to a preselected outer extremity.

The plate 15 is in driven connection with an azimuth motor 23 by a shaft 24 and gears (not shown). A shaft 25 is displaced in direct proportion to the displacement of shaft 24 by a servo system therebetween comprising a control transmitter 26 mechanically connected to the shaft 24 and electrically connected and driving a control transformer 27 by a cable 28, a servo amplifier 29 connected in driven relationship to the output of the control transformer 27 by a cable 30 and a servomotor 31 connected to the output of servo amplifier 29 by a cable 32, the shaft of the servo motor being connected to the shaft 25 and the shaft of the control transformer 27. The shaft 25 is connected to drive revolvable deflection coils 30 of a PPI cathode ray tube 31 by gears (not shown), in synchronism with the rotating plate 15. The video output of the photomultiplier 18 is connected to an amplifier 32 by a conductor 33 and the output of this amplifier is connected to the control grid 34 of cathode ray tube 31 by a conductor 35 through slip rings 36, one output terminal of the photomultiplier 18, one input terminal and one output terminal of the amplifier 32 and one terminal of the slip rings 36 being connected to a ground. The slip rings 36 provide a conductance path for the video output of the photomultiplier 18 to the control grid 34 during the forward scan of the light beam 12 upon the model 14 but interrupts it and grounds the control grid 34 during the return scan, the slip rings being under the control of the scanning motor 20 and its shaft 21.

The plate 11 supports a lead screw 40 which is driven by the output shaft 41 of a differential 42 through gears 43, the lead screw 40 being disposed parallel to the plate 15 and directly above the line of scan thereon. A seeker cell unit 44 is driven by the lead screw 40 so that it is normally directly over the light spot upon the model 14. For such a synchronized condition, the light spot image is focused upon two adjacent photoconducting cells 45 and 46 contained in the seeker cell unit. The photoconducting cell 45 is connected in a series circuit 47 having a battery 48 and the photoconducting cell 46 is connected in a series circuit 49 having a battery 50, the batteries 48 and 50 being oppositely poled. The two series circuits 47 and 49 are connected as branches for the input to amplifier 51 through a conductor 52 and a ground connection. The output of amplifier 51 is connected to a variable speed motor 53 by a cable 54, the output shaft of motor 53 being connected to one input shaft 55 of the differential 42. The other input shaft 56 of the differential 42 is connected to and driven by a constant speed motor 57 through a gear train 58. By selected component values, the photocell seeker unit 44 is driven to constantly seek synchronism with the horizontal movement of the light spot illuminated by the beam of light 12 on its radial scan along the model 14. If the seeker unit 44 is temporarily behind the light spot, the light spot image will be focused only on photocell 45 and this unbalance in the input to the amplifier 51 will cause the motor 53 to speed up the differential output shaft 41 driving the lead screw 40 until the light spot image again is focused on both photoconducting cells 45 and 46. Similarly, if the seeker cell unit is temporarily ahead of its synchronization position, the light spot image is focused only on photocell 46 and this unbalance will cause the lead screw 40 to temporarily slow down.

Additionally the output shaft 41 of the differential 42 drives a potentiometer 60 which is connected across a D.C. reference voltage 61 by a cable 62. The output of the potentiometer 60 controls the deflection coils 30 on the cathode ray tube 31 through an amplifier 63 and a cable 64. By this arrangement, the scope spot on the face of the cathode ray tube is intensity-modulated in accordance with the relative intensity of the reflected beam of light 16 and is radially in synchronism with the horizontal moving component of the light spot on the model. Any shadow areas on the model will cause the light spot movement on the model to accelerate more than that resulting from the light spot crossing a gentle hill on the model having no shadow and the circuit components are selected so as to permit a corresponding acceleration of the scope spot. The very rapidity of the moving scope spot has the effect of causing a shadow area to be displayed on the scope.

Figure 2:
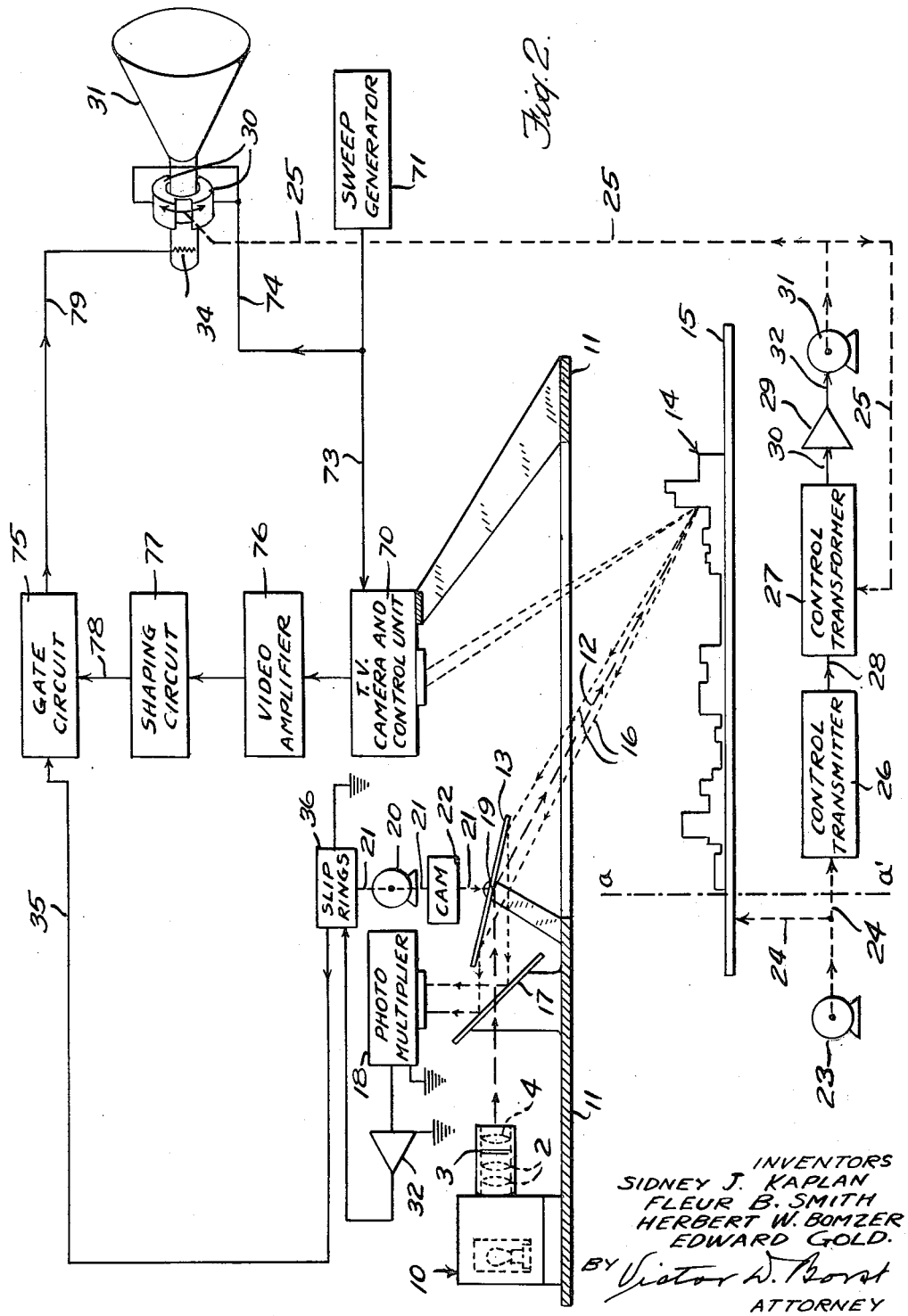
Fig. 2 is a television camera embodiment of the invention disclosed in block diagram.

In the embodiment disclosed in Fig. 2, a television camera 70 is positioned on the plate 11 to observe the trace of the scanning light beam 12 on the model 14, the axis of the camera lens being perpendicular to the line of scan and the plate 15. The vertical scan of the camera is made inoperative and a sweep generator 71 effects a horizontal scan of the image on the camera mosaic through a cable 73. The sweep generator 71 also drives the deflection coils 30 of cathode ray tube 31 by a cable connection 74 therebetween. The video output of the television camera 70 is connected to the controlling input side of a gating circuit 75 through a video amplifier 76 and a shaping circuit 77 by a cable 78. The output of the photo multiplier 18 through the slip rings 36 in conductor 35 is terminated in the input side of the gating circuit 75, while the output of gating circuit 75 is connected to the control grid 34 of cathode ray tube 31 by a cable 79. The gating circuit 75 is designed to remain "open" under the influence of any video output of the television camera which is above a predetermined threshold value representing a shadow region. When the camera sweep detects a shadow area on the mosaic, the magnitude of the camera video output being lower than the predetermined threshold will act to "close" the gate 75 and thus extinguish the scope spot on the tube 31 to reproduce a shadow area. The sweep frequency of generator 71 is normally very much greater than the scanning frequency of the oscillating mirror 13.

Figure 3:
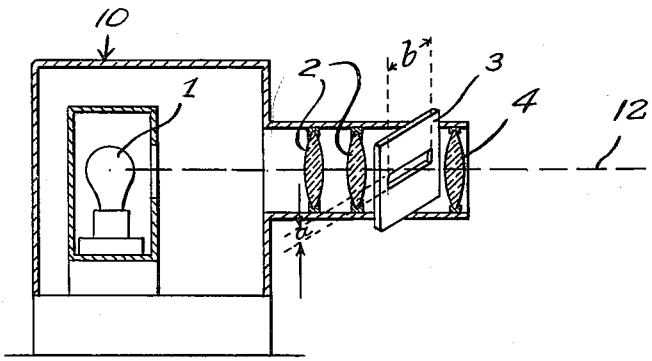
Fig. 3 illustrates the pertinent details of the light projection system employed in Figs. 1 and 2.
Figure 4A:
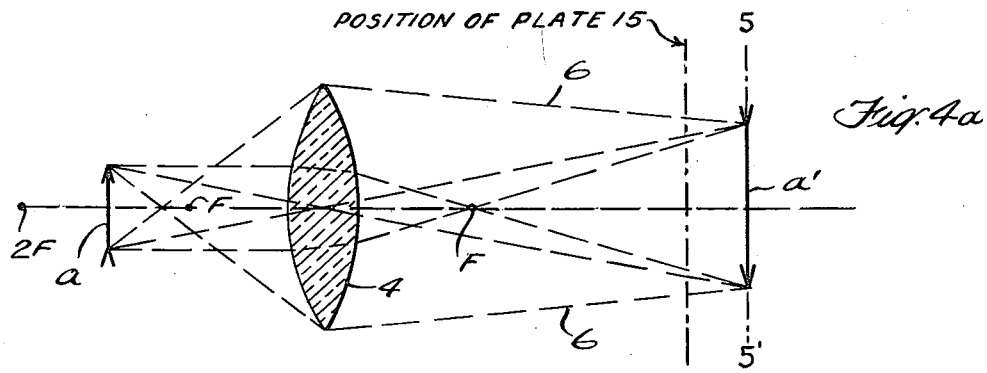
Figs. 4a and 4b explain the structure and theory of the lens system of Fig. 3.
Figure 4B:
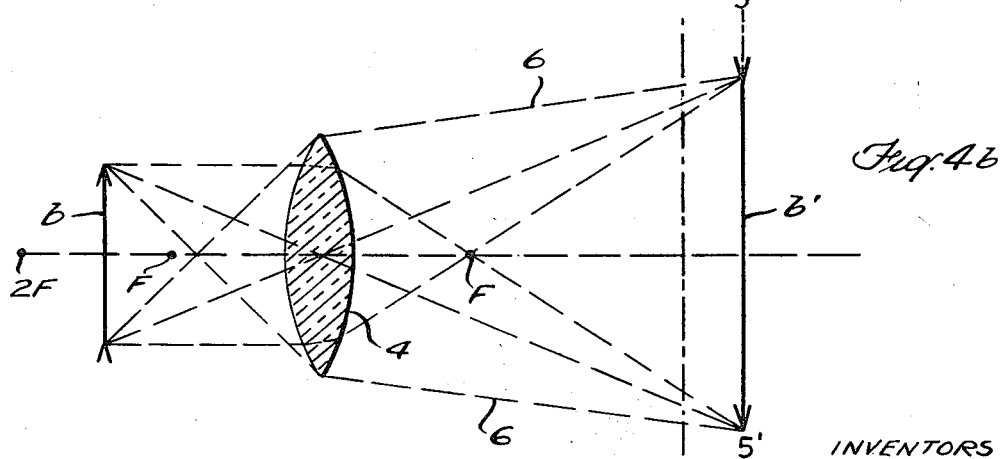

The details of the light beam projection system 10 are disclosed in Fig. 3. Light from a lamp 1 passes through a pair of condensing lenses 2 and a narrow rectangular slit aperture with dimensions $a$ and $b$ in a plate 3. A convex lens 4 projects and focuses a light spot upon the model 14, the aperture plate 3 being disposed at a distance from the lens 4 equal to between its focal length F and twice its focal length 2F. The diameter of the lens 4 is selected so that the image dimension $a'$ and $b'$ of the aperture in the plate 3 on the focal plane 5—5' as shown in Figs. 4a and 4b has the $a'$ dimension smaller than the diameter of the lens 4 and the $b'$ dimension larger than the diameter of the lens 4. The effective diameter of the lens 4 can be controllable in the two perpendicular directions by employing adjustable shutters (not shown) to mask the size of the lens in the two desired directions. For such optical arrangements the envelope 6 of the light beam between the lens 4 and the focal plane 5—5' is convergent for the $a$ dimension of the aperture and divergent for the $b$ dimension.

These conditions will prevail when the diameter of the lens 4 is greater than $Ma$ and less than $Mb$ wherein M is the magnification of the lens 4 for a given distance of the lens 4 from the aperture 3. Since actual radar transmitted pulses widen in the azimuth direction and shorten in the radial direction in a relation with distance from the radar antenna, the structures in Figs. 3, 4a and 4b are employed to simulate this characteristic by positioning the projection system relative to the plane of the model 14 so that the scanning light spot moves on the model between the lens 4 and the focal plane 5—5'.

It is to be understood that various modifications of the invention other than those above described may be effected by persons skilled in the art without departing from the principle and scope of the invention as defined in the appended claims.

What is claimed is:

1. For use in association with a scale model, an optical radar trainer comprising a cathode ray tube having a rotating deflection coil and control grid, a photomultiplier, a photomultiplier output circuit connecting said photomultiplier to the control grid of said cathode ray tube, a light projection system adapted to project a light beam including means for causing said beam to sweep radially over said scale model and for receiving and projecting the light reflected from the model on said photomultiplier which is thereby adapted to modulate said cathode ray tube according to the intensity of the reflected light beam, azimuth means for causing relative angular movement between the projected light beam and the scale model, said azimuth means having a mechanical, synchronizing connection with the deflection coils of said cathode ray tube, and light responsive means electrically connected to said cathode ray tube for producing shadow effects thereon, said light responsive means being adapted to observe continuously the reflected light beam and produce a signal which is responsive to the movement of said beam.

2. An optical radar trainer as claimed in claim 1 wherein said light responsive means comprises a lead screw, a photocell seeker unit movably driven by said lead screw and having two oppositely polarized cells, a variable speed motor connected to said oppositely polarized cells, the said lead screw being in driven connection with said variable speed motor and a potentiometer connected to the deflection coils of said cathode ray tube and driven by said variable speed motor.

3. A radar trainer as claimed in claim 1 wherein said light responsive means comprises a television camera having a video amplifier and a sweep generator, a gating circuit inserted in said photomultiplier output circuit, the said gating circuit being in controlled connection with the said video amplifier and the sweep generator is connected to the said deflection coils of cathode ray tube so as to synchronize the radial sweep thereof with the horizontal sweep of the television camera.

4. A radar trainer as claimed in claim 1 wherein said light projecting system comprises a light source, a convex lens and a plate disposed between the light source and the convex lens, said plate having an aperture with different mutually perpendicular dimensions and being located at a distance from the said lens within the limits of its focal length and twice its focal length and the diameter of the lens being greater than the product of one dimension of the aperture and the magnification of the lens and less than the product of the other dimension of the aperture and the magnification of the lens.

References Cited in the file of this patent

FOREIGN PATENTS 750,628  Great Britain _____ June 20, 1956